United States Patent [19]

Model et al.

[11] 3,903,007

[45] Sept. 2, 1975

[54] DETERGENT COMPOSITION CONTAINING HALOGENATED 2-ACYLOXY-DIPHENYLETHERS

[75] Inventors: Ernst Model, Basel; Jakob Bindler, Riehen, both of Switzerland

[73] Assignee: Ciba-Geigy Corporation, Ardsley, N.Y.

[22] Filed: Feb. 8, 1973

[21] Appl. No.: 330,547

Related U.S. Application Data

[60] Division of Ser. No. 102,053, Dec. 28, 1970, Pat. No. 3,784,684, which is a division of Ser. No. 660,926, Aug. 16, 1967, Pat. No. 3,576,843, which is a continuation-in-part of Ser. No. 570,742, Aug. 8, 1966, Pat. No. 3,506,720, which is a continuation-in-part of Ser. No. 345,080, Feb. 17, 1964, abandoned.

[52] U.S. Cl. ............................. 252/106; 252/107
[51] Int. Cl. ................................. C11d 3/48
[58] Field of Search ..................... 252/106, 107

[56] References Cited
UNITED STATES PATENTS 3,361,795 1/1968 Wakeman et al. ............ 252/106 X
3,405,184 10/1968 Widiger et al. ............... 260/613
3,489,686 1/1970 Parran ......................... 252/106

*Primary Examiner*—Benjamin R. Padgett
*Assistant Examiner*—E. A. Miller

[57] ABSTRACT

Novel diesters of organic dicarboxylic acids and certain halogenated hydroxy-diphenylethers wherein the acyl radical is linked to the benzene nucleus of the diphenylether in 2-position to the ether bridge, which novel esters inhibit microbial growth and are suitable for disinfection and the like purposes, and especially those of the aforesaid diesters wherein at least one diphenyl ether moiety is substituted at least in 4-position and preferably in 4- and 4'-position by halogen, which diesters are particularly useful for the protection of cellulosic materials against bacteria and fungi, and for the treatment of infections of the intestinal system and the urinal tract of warm-blooded animals caused by pathogenic microorganisms; compositions containing the aforesaid novel esters in combination with a carrier therefor; and processes of using the aforesaid compositions for the described purposes.

6 Claims, No Drawings

DETERGENT COMPOSITION CONTAINING HALOGENATED 2-ACYLOXY-DIPHENYLETHERS

Cross-Reference to Related Cases

This application is a division of application Ser. No. 102,053, filed Dec. 28, 1970, now U.S. Pat. No. 3,784,694, which is a division of Ser. No. 660,926, filed Aug. 16, 1967, now U.S. Pat. No. 3,576,843, which is a continuation-in-part of Ser. No. 570,742, filed Aug. 8, 1966, now U.S. Pat. No. 3,506,720, which is a continuation-in-part of application Ser. No. 345,080, filed Feb. 17, 1964, now abandoned.

The present invention concerns novel esters of organic dicarboxylic acids with certain halogenated diphenylethers, wherein the acyl radical is linked to one benzene nucleus of the diphenylether in o-position to the ether bridge. These novel esters comprise nuclei of the formula

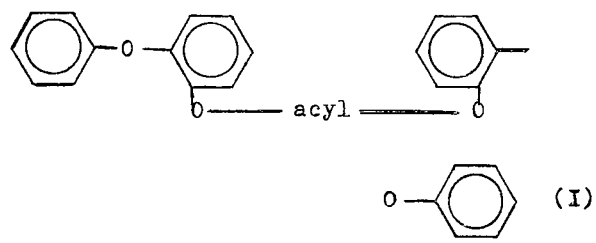

wherein "acyl" is the radical of an aliphatic saturated $\alpha,\omega$-dicarboxylic acid of from 2 to 12 carbon atoms or of an aliphatic unsaturated $\alpha,\omega$-dicarboxylic acid of from 4 to 12 carbon atoms, and which nuclei are substituted in the manner described in the individual diphenyl ether moieties under Formulas IA to IF below. Halogen-o-hydroxydiphenyl ethers the dicarboxylic acid esters of which are compounds of the instant invention as defined above and have particularly good activity against microorganisms, are those of the following classes:

a. diphenylethers of the formula

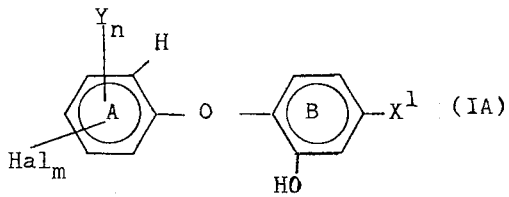

wherein

Hal represents a halogen atom,
$m$ is an integer ranging from 0 to 4,
$n$ is one of the integers 0 to 2, and the sum of $m + n$ is not more than 4; preferably $n$ is one;
$X^1$ is a halogen atom, preferably chlorine or bromine,
each Y, independently of the other, represents hydrogen, alkyl of from 1 to 3 carbon atoms, alkoxy of from 1 to 3 carbon atoms, alkanoyl of from 1 to 4 carbon atoms, $-CF_3$, $-CN$ or $-NH_2$; but preferably not more than one Y is an alkoxy, alkanoyl or $NH_2$ group; and "alkanoyl" in the definition of Y having preferably 2 to 4 carbon atoms; preferred compounds in this subclass of diphenyl ethers of Formula IA, being those of the formula

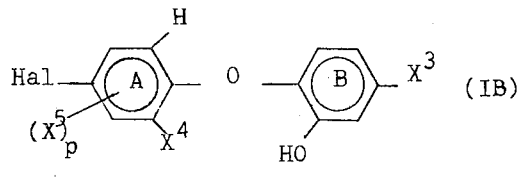

wherein $X^3$ is a member selected from the group consisting of chlorine, bromine and fluorine,
Hal is a halogen atom,
$X^4$ is a member selected from the group consisting of hydrogen, chlorine, bromine and cyano,
$X^5$ is a member selected from the group consisting of hydrogen, chlorine, bromine, alkyl of from 1 to 3 carbon atoms, and
$p$ is one of the integers 1 and 2; and next preferred in the subclass of Formula IA being compounds of the formula

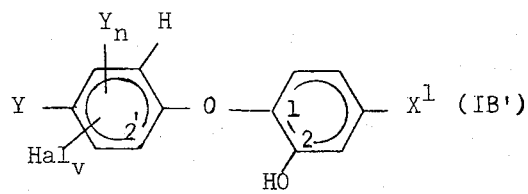

wherein each of Hal, $X^1$, Y and n have the same meanings as in Formula IA, and $v$ represents 1, 2 or 3, the sum of $n$ and $v$ being at most 3.

b. diphenylethers of the formula

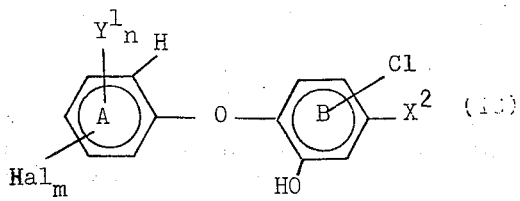

and, preferably those falling under Formula IC which are of the formula

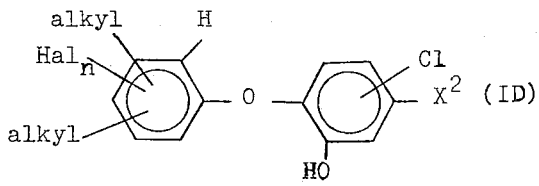

wherein

Hal and $m$ and $n$ have the above-given meanings, the sum of $m + n$ in Formula IC not exceeding 4,
$X^2$ is a member selected from the group consisting of hydrogen d chlorine, and
$Y^1$ is a member selected from the group consisting of hydrogen, alkyl of from 1 to 3 carbon atoms, and cyano;
"alkyl" is an alkyl radical of from 1 to 3 carbon atoms; (Preferably, Y in Formula IA has the same meaning as $Y^1$ in Formula IC).

c. diphenylethers of the formula

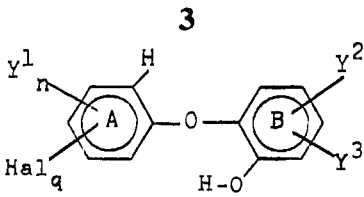

(IE)

wherein

Hal and $n$ have the same meanings as in Formula IA, each of $Y^1$, $Y^2$ and $Y^3$ is a member selected from the group consisting of hydrogen, alkyl of from 1 to 3 carbon atoms and cyano, at least one of $Y^2$ and $Y^3$ being preferably either alkyl of 1 to 3 carbon atoms or cyano;

$q$ is an integer ranging from 2 to 3; and the sum of $n + q$ is not more than 3;

d. diphenylethers of the formula

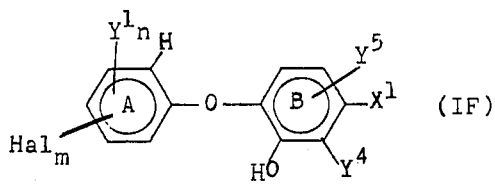

(IF)

wherein

Hal, $m$, $n$, $X^1$ and $Y^1$ have the meanings given hereinbefore, the sum of $m + n$ is not greater than 4, $Y^4$ is a member selected from the group consisting of hydrogen, alkyl of from 1 to 3 carbon atoms and allyl, and $Y^5$ is a member selected from the group consisting of hydrogen and alkyl of from 1 to 3 carbon atoms, at least one of $Y^4$ and $Y^5$ being one of the aforesaid members other than hydrogen.

By "halogen" as used in this specification and in the appended claims, there are meant fluorine, bromine, iodine, and, preferably, chlorine.

Among these preferred halogen-o-oxydiphenyl ethers of the Formulas IA to IF, two sub-groups can be distinguished whose esters with organic dicarboxylic acids as defined above have particularly good bactericidal activity in washing agents and which disinfect washed goods and protect them against growth of microorganisms thereon: i.e., o-oxyphenyl ethers the benzene ring B of which is unhalogenated, of the formula

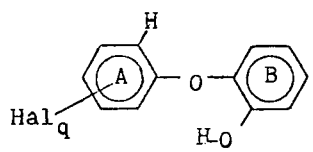

(II)

wherein

Hal has the above-given meaning, and $q$ is one of the integers 2 and 3, and the o-oxydiphenyl ethers halogenated in benzene ring B in the p-position to the ether bond, of the formula

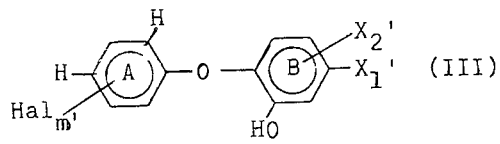

(III)

wherein

Hal has the above-given meanings and $X_1'$ and $X_2'$ both represent chlorine; or $X_1'$ represents bromine and $X_2'$ represents hydrogen, and $m'$ represents a positive integer of 0 to 3.

In the compounds of Formula II and III, the benzene ring A can also contain the methyl, the trifluoromethyl or the methoxy group.

The total number of halogen atoms in the molecule of these compounds is at most 5; when the benzene rings, preferably ring B, further contain lower alkyl groups which may be halogenated, the light-fastness of the diesters of ethers of Formula III is generally enhanced. Two alkyl groups in ring B are then preferred.

(When, in this specification and the appended claims, the symbol H is linked to a specific position of a benzene nucleus, as in the above and in some subsequent formulas, this means that that position is only occupied by hydrogen and not by any other substituent of that ring encompassed by the respective formula).

The invention further concerns a process for the combatting and control of microorganisms and for the protection of organic materials and articles from microorganisms particularly from bacteria and especially from infestation with bacteria and growth of bacteria thereon; it specially concerns, in a first sub-aspect, a process for the disinfection of personal and household linen, and for the protection of such materials from growth of microorganisms thereon. The invention also concerns bactericidal compositions, preferably washing agents and liquors.

The new process according to the aforesaid first sub-aspect of the invention, of controlling microorganisms and, particularly, bacteria, and more especially of disinfecting a substrate normally permitting undesirable growth of bacteria thereon and/or protecting said substrate against such growth, consists essentially of applying to said substrate a disinfecting and bacterial growth-inhibiting amount of the diesters of halogen-o-hydroxy-diphenyl ethers and organic dicarboxylic acids as defined hereinbefore.

Compositions according to the invention which contain an ester of an organic dicarboxylic acid as defined hereinbefore and a diphenylether of one of Formulas IA to IF, supra, as active ingredients, in a bacterial growth-inhibiting amount, are distinguished by slight toxicity for warm blooded animals and, in conventionally used concentrations, do not irritate the skin. They are bactericidally effective both against gram positive as well as gram negative bacteria, for example, against Bacillus mesentericus, Sarcina spec. and particularly against forms of Coli such as against Escherichia coli 96 and other gram negative organisms. A further advantage of the halogen-o-oxydiphenylether dicarboxylates according to the invention is their colorlessness or slight inherent color. This property enables them to be used for many purposes for which it is not possible to use strongly colored known bactericidal compounds.

The above-described compounds used under the first sub-aspect according to the invention are not soluble in water but are soluble in all practical organic solvents. Because of this solubility, they can be used in very many ways for the combatting of microorganisms, particularly of bacteria, and for the protection of organic materials and objects against growth of and from attack by microorganisms thereon.

The dicarboxylates according to the invention can be incorporated directly into the various kinds of material to be protected, for example in material having a synthetic resin basis, as polyamide and polyvinylchloride, or in paper treatment liquors, in printing thickeners made from starch or cellulose derivatives, in lacquers and paints which contain, e.g. casein, in cellulose, in viscose spinning mass, in paper, in animal mucilages or oils, in permanent dressings having a basis of polyvinyl alcohols, in cosmetic articles such as in soaps, e.g., in hand or toilet soap, in ointments or powders. They can also be added to preparations of inorganic or organic pigments for the painting industry, plasticisers, etc.

Compared with the esters of the halogenated hydroxydiphenyl ethers of Formulas IA to IF, and organic monocarboxylic acids, the dicarboxylic acid esters of the present invention are distinguished by an unexpected better stability in media containing active chlorine. Also, they release the free diphenyl ethers much more slowly, and possess desirably low vapor pressures. These advantages are true particularly for those diesters in which the acyl moiety has at least 4 carbon atoms.

In addition, they can be used with wetting or dispersing agents in the form of their aqueous dispersions, e.g., for the protection of substances which tend to rot, such as for the protection of leather, paper etc.

solutions or dispersions of active ingredient which can be used for the protection of these materials advantageously have a content of active ingredient of at least 0.001 g/liter.

A preferred use for the diphenyl ether derivatives consists in disinfecting goods which are washed, and protecting such goods from attack by microorganisms. For this purpose, either washing or rinsing liquors are used which contain the novel dicarboxylates advantageously in concentrations of about 1 to 200 parts per million calculated on the liquor.

As wash-active substances, the washing liquors contain, for example, anion active compounds such as aromatic sulfonic acids substituted by lipophilic groups or their water soluble salts such as the sodium salt of dodecyl benzene sulfonic acid, or water soluble salts of sulfuric acid monoesters of higher molecular alcohols or their polyglycol ethers, e.g. soluble salts of dodecyl alcohol sulfate, or of dodecyl alcohol polyglycol ether sulfate, or alkali metal salts of higher fatty acids (soaps), also non-ionogenic wash-active substances such as polyglycol ethers of higher fatty alcohols, polyglycol ethers of higher molecular alkylated phenols as well as so-called "amphoteric" wash-active substances such as reaction products of the alkali metal salts of low halogen fatty acids and polyalkylene polyamines containing lipophilic radicals, e.g., lauryl diethylenetriamine. In addition the liquor can also contain the usual auxiliaries such as water soluble perborates, polyphosphates, carbonates, silicates, optical brightening agents, plasticisers, salts having an acid reaction such as ammonium or zinc silicofluoride or certain organic acids such as oxalic acid, also dressings such as, e.g., those having a basis of synthetic resin or starch.

Chiefly, organic fibers are meant by goods which can be disinfected with the washing or rinsing liquors according to the invention, containing the above-described active compounds, namely those of natural origin such as cellulosic fibers, e.g. cotton, or polypeptide fibers, e.g. wool or silk, as well as fibers of synthetic origin such as polyamide, polyacrylonitrile or polyester fibers or mixtures of the aforesaid fibers.

In the concentrations mentioned above, the diphenyl ether derivatives usable according to the invention disinfect the wash liquor as well as the goods to be washed therein substantially free from Coli and other bacteria, and these substrates remain free from these bacteria for a long time even after exposure to light of the active ingredient or of the goods treated therewith. They differ from other bactericidally active compounds particularly in their stability to light on the goods treated therewith.

In another aspect the invention concerns the protection of cellulosic materials such as wood and plants from the attack of microorganisms, among them rot-causing fungi and pathogenic fungi, including phytopathogenic fungi.

Such protection comprises the application to the surface of such materials, or incorporation thereinto, of esters of an organic dicarboxylic acid as defined and a compound of the formula IB, and preferably of such esters of compounds of the formula

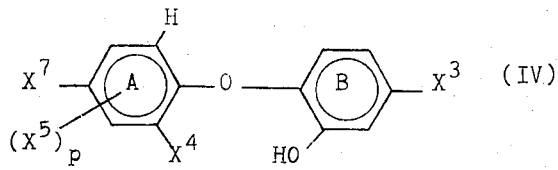

wherein
$X^7$ represents chlorine or bromine, and
$X^3$, $X^4$, $X^5$ and p have the same meanings as in formula IB, but $X^3$ is preferably chlorine or bromine,
in an amount sufficient to inhibit the growth of such microorganisms as rot-causing and pathogenic fungi.

According to a further aspect, this invention concerns more particularly a process for combatting pathogenic bacteria in the intestinal system and the urinal tract of warm-blooded animals, and, more particularly, in all mammals, consisting essentially of administering to a warm-blooded animal suffering from an attack of pathogenic bacteria in one of the said organs a bacterial growth-inhibiting amount of dicarboxylic acid esters, according to the invention, of compounds of formula IB, but particularly of formula IV, alone or in combination with an inert carrier, and especially in mixture with pharmaceutically acceptable carrier therefor of the types described in detail further below.

The esters of organic dicarboxylic acids and diphenyl ethers of Formula IV thus have antimicrobial properties of surprising intensity and variety while, at the same time, their toxicity is relatively slight. Because of these properties as well as their stability, their substantially colorlessness and absence of irritation to the skin and mucous membranes, they can be used as antimicrobial active substances for the most various purposes, for example, for the protection of organic materials and objects from microorganisms, particularly from attack by bacteria, and also as disinfectant additives in soaps and washing agents as well as in ointments for the skin and other preparations for personal hygiene. Their use, as active ingredients, is particularly valuable for the healing of diseased conditions of the intestinal system and urinal tract of warm blooded animals as can be seen from their excellent activity against the pathogenic fungi and bacteria given below, their elimination from the body in substantially unchanged, active form and their relatively slight toxicity.

Those of the dicarboxylic acid esters according to the invention which are esters of compounds of Formula IV show an even longer duration of antibacterial activity than the corresponding compounds of Formula IV themselves usually accompanied by a shift of activity from the urinary tract to the intestines of warm-blooded animals. Also they are particularly active against staphylococcus aureus.

The compounds of Formula IV also have an excellent growth-inhibiting action, for example, on the following gram positive and gram negative bacteria: Staphylococcus lactis, Escherichia coli, Bacillus subtilus, Corynebacterium diphtheriae, Clostridium botulinum, Clostridium butyricum, Clostridium welchii, Clostridium tetani, Klebsiella pneumoniae, Alcaligenes faecalis, Salmonella pullorum, Salmonella typhi, Salmonella parathypi A and B, Salmonella typhi murium, Salmonella enteritidis, Shigella dysenteriae, Shigella flexneri, Brucella abortus, Proteus mirabilis, Achromobacter spec., Serratia marcescens, Pasteurella pseudotuberculosis, Bacillus pumilus.

Optimal results in the control of bacteria are obtained with diesters of the compounds falling under Formula IV in which $X^5$ is hydrogen, and which diesters are of the formula

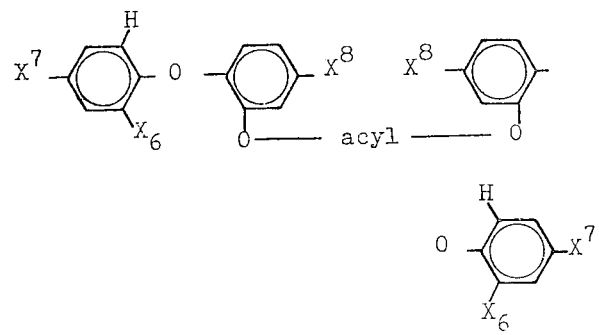

wherein $X^6$ is a member selected from the group consisting of hydrogen and chlorine, $X^7$ is a member selected from the group consisting of chlorine and bromine, and $X^8$ is a member selected from the group consisting of chlorine and bromine.

The novel dicarboxylates usable according to the invention can also be used in combination with other antimicrobially active substances, for example they can be used with halogenated salicylic acid alkyl amides and anilides, with halogenated diphenyl ureas, with halogenated benzoxazoles or benzoxazolones, with polychlorohydroxydiphenyl methanes, with halogendihydroxydiphenyl sulphides, with bactericidal 2-imino-imidazolidines or -tetrahydropyrimidines or with biocidal quaternary compounds or with certain dithiocarbamic acid derivatives such as tetramethyl thiuram disulphide.

In addition, with some of the above-mentioned combinations of novel diphenyl ether derivatives according to the invention and other antimicrobial substances, there is a broadening of the range of action and/or a synergistic effect. For example, the action of di-(4,4'-dichloro-2-hydroxydiphenyl) ether succinate or adipate combined with halogenated hydroxydiphenyl methanes, halogenated salicylic acid anilides and/or with halogenated diphenyl ureas, on ubiquitous bacilli such as, e.g. Bacillus mesentericus and Sarcina uriae is clearly improved. The same is also true, e.g. of combinations of di-(4,2',4'-trichloro-2-hydroxydiphenyl ether) -fumarate or adipate and halogenated ureas or halogenated salicylic acid anilides.

The diphenyl ethers of the foregoing formulas possessing a free hydroxyl group are obtained from known starting materials by various processes, which have been described in our patent applications 345,080 and 570,742, supra.

The novel diester derivatives according to the invention are obtained from the correspondingly substituted hydroxy-diphenyl ethers which fall under the respective Formulas I A - IF, by reaction, in the absence or presence, dependent on the respective acid, of an acid binding agent, with the corresponding acyl halides.

The following non-limitative examples further illustrate the above-described aspects of the invention. The temperatures are given in degrees Centigrade. Percentages are by weight unless expressly stated otherwise.

EXAMPLE 1

A solution of 15.3 g. of fumaryl chloride in 50 ml of anhydrous benzene is added drop by drop to a solution of 63 g. of the sodium salt of 4,4'-dichloro-2-hydroxydiphenyl ether in 200 ml. of anhydrous benzene, while stirring well and maintaining the temperature of the solution at 10°–15°. After standing for 3 hours at that temperature, sodium chloride crystals formed in the solution are separated by filtration and benzene is removed from the filtrate by distillation under vacuum. The residue is recrystallized from benzene/petroleum ether. The pure 2,2'-fumaroyloxy-bis-(4,4'-dichlorodiphenyl ether) thus obtained has a melting point of 147°–148°.

By using, in lieu of fumaryl chloride, the acyl chloride listed in column I of Table A below and using, instead of the diphenyl ether derivative used therein, the 2-hydroxy-diphenyl ethers substituted as shown in column II of the Table below, and otherwise observing the conditions described in Example 1, there are obtained 2,2'-acyloxy-bis-diphenyl ether derivatives, the acyl radical of which is that shown in column I and the substitution of the diphenyl-ether moieties of which is that shown in column II of Table A:

Table A

| Ex. No. | I | II |
|---|---|---|
| 2 | oxaloyl chloride | 4,4'-dibromo- |
| 3 | malonoyl chloride | 4,4'-dichloro-3'-methyl- |
| 4 | succinoyl chloride | 4,2',4'-trichloro- |
| 5 | glutaroyl chloride | 4-bromo-4'-chloro- |
| 6 | adipoyl chloride | 4-chloro-4'-bromo- |
| 7 | pimeloyl chloride | 4,4'-dibromo- |
| 8 | sebacoyl chloride | 4-chloro-4'-fluoro- |
| 9 | dodecane-di-oyl chloride | 4,4'-dichloro- |
| 10 | adipoyl chloride | 4,4'-dichloro- |

Further esters of organic carboxylic acids with halogenated hydroxy-diphenyl ethers according to the invention having similar good antimicrobial properties as the esters of the preceding examples are obtained by repeating Example 1 but using each of the acid halides used in Examples 1 through 10 with each of the diphenyl ethers having the substitution listed below, which diphenyl ethers are prepared as described in our patent application 570,742, supra.

Table B

| No. | II Substitution of ring B | III Substitution of ring A |
|---|---|---|
| a | none | 2',4'-di-chloro |
| b | none | 2',4',5'-trichloro |
| c | 4-chloro | none |
| d | '' | 4'-chloro |
| e | '' | 4'-bromo |
| f | '' | 4'-iodo |
| g | '' | 4'-fluoro |
| h | '' | 2'-chloro |
| i | '' | 3',4'-dichloro |
| j | '' | 2',4'-dichloro |
| k | '' | 2',4',5'-trichloro |
| l | '' | 2',3',4',5'-tetrachloro |
| m | 4-chloro | 3'-methyl-4'-chloro |
| n | 4-bromo | none |
| o | 4-bromo | 4'-chloro |
| p | 4-bromo | 4'-bromo |
| q | 4-chloro | 4'-methoxy |
| r | '' | 3'-trifluoro-methyl-4'-chloro |
| s | 4-chloro-5-methyl | 4'-chloro |
| t | 4-chloro-3,5-dimethyl | 4'-chloro |
| u | 4,6-dichloro | 4'-chloro |
| v | '' | 2',4'-dichloro |
| w | 6-chloro | 3',4'-dichloro |
| x | 6-chloro | 4'-chloro |
| y | none | 3',4'-dichloro |
| z | none | 2',4'-difluoro |
| aa | '' | 2',4'-dibromo |
| bb | 4-bromo | 2',4'-dichloro |
| cc | 4-chloro | 2',5'-dimethyl-4'-chloro |
| dd | '' | 2',4'-dimethyl |
| ee | '' | 2',4'-dibromo |
| ff | 4,6-dichloro | none |
| gg | 4-bromo | 2',5'-dibromo |
| hh | 4,6-dichloro | 2',5'-dichloro |
| ii | 4-chloro | 4'-chloro-2'-cyano |
| jj | 6-chloro | 2',4'-dichloro |
| kk | 4,5-dichloro | 4'-chloro-2'-cyano |
| ll | 3-allyl-4-chloro | 4'-chloro |
| mm | 4-chloro | 2'-isopropyl-5'-methyl |
| nn | '' | 4'-ethyl |
| oo | 4,6-dichloro | 3'-methyl-4'-chloro |
| pp | 6-chloro | 2',5'-dimethyl-4'-chloro |
| qq | none | 2',4'-dichloro-5'-methyl |
| rr | 4,5-dimethyl | 2',4',5'-trichloro |
| ss | 4-methyl | '' |
| tt | 4-chloro-5-methyl | 4'-bromo |
| uu | 4-chloro-3,5-dimethyl | '' |
| vv | 4-chloro-5-methyl | 3'-methyl-4'-chloro |
| ww | 4-bromo | 2',4'-dibromo |
| xx | 3-allyl-4-chloro | 2',4'-dichloro |
| yy | 4-bromo | 2',3',4'-tribromo |
| zz | 4-bromo | 3',4'-dibromo |
| aaa | 6-chloro | 4'-iodo |
| bbb | 6-chloro | 2',3',4'-trichloro |
| ccc | 6-chloro | 4'-bromo |
| ddd | 4,6-dichloro | 2',4'-dibromo |
| eee | 4,5-dimethyl | 5'-methyl-2',4'-dichloro |
| fff | 4-methyl | 3',5'-dimethyl-2',4'-dichloro |
| ggg | 4-methyl | 2',4',5'-tribromo |
| hhh | 4-methyl | 2',4'-dibromo |
| iii | 4,5-dichloro | 2',4'-dichloro |
| jjj | 4,5-dichloro | 4'-chloro-3'-methyl |
| kkk | 4-chloro | 2'-chloro-4'-cyano |
| lll | 4,5-dimethyl | 2',4'-dichloro |
| mmm | 4-fluoro | 2',4'-dichloro |

The following non-limitative examples further illustrate the processes of controlling pathogenic bacteria, according to the invention:

EXAMPLE I

A. Use in washing liquor

One of the active ingredients given below which, to attain better dispersion has been dissolved in ethylene glycol monomethyl ether (in the ratio of 1 part of active ingredient to 20 parts of solvent) is added in a concentration of 50 mg. per liter to a washing liquor containing 1.5 g. per liter of sodium soap. Cotton cambric is introduced into this liquor (liquor ratio 1:20) and the bath is heated to 90°. The textile material is treated for 20 minutes at this temperature, then rinsed twice for 3 minutes at 40° with permutite water (liquor ratio 1:20), centrifuged and dried and ironed.

B. Test of the action on bacteria

Circular samples having 20 mm. diameter of the textile material washed and finished according to paragraph A are placed on agar dishes which have been inoculated either with 24-hour-old cultures of Staphylococcus aureus SG 511 or with Escherichia coli 96. The agar plates are incubated for 24 hours at 37°.

C. Result

Neither Staphylococcus aureus SG 511 nor Escherichia Coli 96 are found to be present in the circular samples treated with the following halogen-o-hydroxydiphenyl ether dicarboxylates. An area free from bacteria is formed around the samples on the agar.

D. Active Substances

The fumaric acid diesters and the adipic acid diesters of the following halogen-o-hydroxydiphenyl ethers are tested in this example:

4,4'-dichloro-2-hydroxydiphenyl ether,
4-chloro-4'-bromo-2-hydroxydiphenyl ether,
4-chloro-4'-fluoro-2-hydroxydiphenyl ether,
4,2',4'-trichloro-2-hydroxydiphenyl ether,
4,2',4',5'-tetrachloro-2-hydroxydiphenyl ether,
4-bromo-4'-chloro-2-hydroxydiphenyl ether,
4-bromo-2',4'-dichloro-2-hydroxydiphenyl ether, and
4,4'-dibromo-2-hydroxydiphenyl ether.

EXAMPLE II

A solution of each of the following active substances in ethylene glycol monomethyl ether containing 50 mg/liter (1 part of active substance in 20 parts of solvent) is added to equal parts of a washing liquor prepared for it containing 0.3 g. per liter of octylphenol polyglycol ether and 1.7 g. per liter of "wash alkali" (sodium polyphosphate). Cuttings of cotton cambric (liquor ratio 1:20) are washed for 20 minutes at 90° in the liquors so prepared, then rinsed with permutite water in a liquor ratio of 1:20, centrifuged, dried and ironed.

The washed and finished textile cuttings are tested by the methods given in Example I, paragarph B. The circular cuttings washed in the presence of the following esters of halogen-o-hydroxydiphenyl ethers show no growth of Staphylococcus aureus SG 511 or Escherichia coli 96 and there is a clear area around the samples on the previously innoculated agar in which there is no bacterial growth.

In this example, the diesters produced as described in Examples 1 through 10 were tested as protective agents.

EXAMPLE III

One of the active substances given below which for better dispersion has been dissolved in ethylene glycol monomethyl ether (1 part of active substance in 20 parts of solvent) is added to equal parts of a washing liquor containing 1.5 g. per liter of sodium soap in a concentration of 100 mg/liter. Pieces of wool muslin are washed in this preparation at 40°, liquor ratio 1:20. The textiles are left for 20 minutes at this temperature and then rinsed twice for 3 minutes at 40° with permutite water, liquor ratio 1:20, centrifuged and dried.

The resistance of the goods treated to bacteria is tested as described in Example I, paragraph B. The goods treated with the following active substances according to paragraph A remained free from Staphylococcus aureus SG 511 and Eschericia coli 96 and an area free from bacteria was formed on the agar round the samples.

The fumaric acid diesters of the following halogen-o-hydroxydiphenyl ethers are tested:
 4,4′-dichloro-2-hydroxydiphenyl ether,
 4-chloro-4′-bromo-2-hydroxydiphenyl ether,
 4-chloro-4′-fluoro-2-hydroxydiphenyl ether,
 4,2′,4′-trichloro-2-hydroxydiphenyl ether,
 4-bromo-4′-chloro-2-hydroxydiphenyl ether,
 4,5,4′-trichloro-2-hydrocydiphenyl ether,
 4-bromo-2′,4′-dichloro-2-hydroxydiphenyl ether, and
 4,4′-dibromo-2-hydroxydiphenyl ether.

EXAMPLE IV

Instead of 50 mg/liter active substance, 100 mg/liter of each active substance are added to equal parts of the washing liquor described in Example II. A cutting of wool muslin is washed in each of these preparations and the washing is finished as described in Example III.

The resistance of the treated goods to the growth of bacteria is tested as described in Example I, paragraph B. It showed complete absence of Staphylococcus aureus SG 511 and Escherichia coli 96 on the treated goods. The samples are clearly surrounded by a bacteria-free zone on the agar.

The fumaric acid diesters of the following halogen-o-hydroxydiphenyl ethers are tested:
 4,4′-dichloro-2-hydroxydiphenyl ether,
 4-chloro-4′-bromo-2-hydroxydiphenyl ether,
 4-chloro-4′-fluoro-2-hydroxydiphenyl ether,
 4,2′-dichloro-2-hydroxydiphenyl ether,
 4,2′,4′-trichloro-2-hydroxydiphenyl ether, and
 4-bromo-4′-chloro-2-hydroxydiphenyl ether.

EXAMPLE V

Fabric made of nylon staple fiber is washed with the liquors prepared according to Example III. The resistance of the treated goods to the growth of bacteria is tested as described in Example I, paragraph B.

Here also the treated goods proved to be free from Staphylococcus aureus SG 511 and Escherichia coli 96. The samples are surrounded by a zone on the agar which is clearly free from bacteria.

The fumaric acid diesters of the following halogen-o-hydroxydiphenyl ethers are tested:
 4,4′-dichloro-2-hydroxydiphenyl ether,
 4-chloro-4′-bromo-2-hydroxydiphenyl ether,
 4,2′,4′-trichloro-2-hydroxydiphenyl ether,
 4-bromo-4′-chloro-2-hydroxydiphenyl ether,
 4-bromo-2′,4′-dichloro-2-hydroxydiphenyl ether, and
 4,4′-dibromo-2-hydroxydiphenyl ether.

EXAMPLE VI

A liquor is prepared according to Example IV. Fabric made of nylon staple fibers is treated therein and finished as described in Example III and tested according to Example I, paragraph B. The treated goods prove to be free from Staphylococcus aureus SG 511 and Escherichia coli 96. The samples are surrounded by a zone on the agar which is clearly free from bacteria.

The fumaric acid diesters of the following halogen-o-hydroxydiphenyl ethers are tested:
 4,4′-dichloro-2-hydroxydiphenyl ether,
 4-chloro-4′-bromo-2-hydroxydiphenyl ether,
 4,2′,4′-trichloro-2-hydroxydiphenyl ether, and
 4-bromo-4′-chloro-2-hydroxydiphenyl ether.

EXAMPLE VII

In 200 g. of viscose containing 9.0 percent cellulose, 1.5 percent of the fumaric acid diester and the adipic acid diester, respectively, of 4,2′,4′-trichloro-2-hydroxydiphenyl ether (calculated on the weight of the cellulose) are added and mixed into the viscose for 20 minutes. Air is then removed from the viscose whereupon viscose films are produced in the known way, washed, desulfurized and dried. Circular samples of 20 mm. diameter are cut from the viscose films and these are tested as to their resistance to bacteria as described in Example, paragraph B, for textile samples.

The treated goods showed complete absence of Staphylococcus aureus SG 511 and Escherichia coli 96. There is a clear bacteria-free zone encircling the samples on the agar.

The antimicrobial compositions according to the invention contain at least one compound of the Formulas IA to IV inclusive as active ingredient together with the usual pharmaceutical carriers. The type of carriers depends to a great extent on the intended use. Ointments, powders and tinctures are used in particular for external application, for example for the disinfection of healthy skin and also for the disinfection of wounds and for the treatment of dermatoses and affections of the mucous membranes which are caused by bacteria or fungi. The ointment bases can be anhydrous, e.g. they can consist of mixtures of wool fat and soft paraffin, or they can consist of aqueous emulsions in which the active substance is suspended. Suitable carriers for powders are, e.g. starches, such as rice starch, the bulk weight of which if desired, can be made lighter, e.g., by the addition of highly dispersed silicic acid or heavier by the addition of talcum. Tinctures contain at least one active ingredient of the Formulas IA to IV in aqueous ethanol in particular 45–75 percent ethanol, to which, if desired, 10–20 percent glycerin can be added. Solutions prepared from the usual solubility promoters such as, e.g. polyethylene glycol, and also optionally, from emulsifying agents, are used in particular for the disinfection of healthy skin. The content of active ingredient in the above forms for external application is preferably between 0.1 and 5 percent.

Gargles or concentrates for the preparation thereof and also tablets for slow dissolution in the mouth are suitable for the disinfection of the mouth and throat. The former are prepared in particular from alcoholic solutions containing about 1–5 percent of active substance to which glycerin and/or flavourings can be added. Lozenges, i.e., solid dosage units, have a relatively high content of sugar or similar substances and a relatively low content of active substance of about 0.2 – 20 percent, as well as the usual additives such as binding agents and flavourings.

Tablets, dragees (sugar-coated tablets) and capsules are used in particular for intestinal disinfection and for the oral treatment of infections of the urinal tract. These preferably contain between 10 percent and 90 percent of an active substance of the general formula I to enable the administration of daily doses of between 0.1 and 2.5 g to adults or of suitably reduced doses to children to be made. Tablets and dragee cores are produced by combining the active substances of the general formula I with solid, pulverulent carriers such as lactose, saccharose, sorbitol, maize starch, potato starch or amylopectin, cellulose derivatives or gelatines, preferably with the addition of lubricants such as magnesium or calcium stearate or polyethylene glycols of suitable molecular weight. Dragee cores are then coated, for example, with concentrated sugar solutions which can also contain, e.g. gum arabic, talcum and/or titanium dioxide, or they are coated with a lacquer dissolved in volatile organic solvents or mixture of solvents. Dyestuffs can be added to these coatings, e.g., to differentiate between varying dosages. Soft gelatine capsules and other closed capsules consist, for example, of a mixture of gelatines and glycerine and contain, e.g., mixtures of an acitve ingredient of the general formula I with polyethylene glycol. Hard gelatine capsules contain, for example, granulates of an active substance with solid pulverulent carriers such as, e.g., lactose, saccharose, sorbitol, mannitol; starches such as potato starch, maize starch or amylopectin, cellulose derivatives or gelatin, as well as magnesium stearate or stearic acid.

In all forms for administration, compounds of the aforesaid formulas can be present as sole active ingredient or they can also be combined with other known antimicrobial, in particular antibacterial and/or antimycotic, active substances, for example to broaden the range of application. Also, carriers which themselves have favourable pharmacological properties may be used such as, e.g., sulfur as a powder base or zinc stearate as a component of ointment bases.

The following examples give a number of typical forms of application but the invention also embraces the choice of different amounts of components as well as other usual carriers and additives. The fumaric acid diesters of 2-hydroxy-4,4'-dichlorodiphenyl ether ($\alpha$), and 2-hdyroxy-4,2',4'-trichlorodiphenyl ether ($\beta$) are used as active ingredients in Examples VIII to XIV, depending on the Greek letter given after each of these examples.

EXAMPLE VIII ($\alpha$)

Hand Disinfectant: A solution of 3.00 g. of active substance and 3.00 g. of sodium sulforicinoleate in 47.00 g. of polyethylene glycol 400 is prepared and also 7.00 g. of sodium dodecyl sulfate are dissolved in 39.85 g. of water. The two solutions are mixed and 0.15 g. of perfume are added to the mixture. The liquid obtained is dropped or sprayed onto the hands and rubbed in.

EXAMPLE IX ($\beta$)

Wound Dusting Powder: 3.00 g. of active substance, 5.0 g. of zinc oxide and 41.9 g. of rice starch are thoroughly mixed with 50.0 g. of talcum which has been impregnated with 0.1 g. of perfume. The mixture is passed through a suitable sieve and again well mixed.

EXAMPLE X ($\alpha$)

Anitseptic Ointment: 3.0 g. of active ingredient are rubbed with 3.0 g. of paraffin oil, the mixture is melted at a moderate temperature and 10.0 g. of wool fat and 84.0 g. of white soft paraffin are added. The mixture is allowed to cool while stirring.

EXAMPLE XI ($\alpha$)

Lozenges for the disinfection of the mouth and throat: 50.0 g. of active substance are carefully mixed with 400.0 g. of castor sugar and the mixture is evenly wetted out with a granulating solution of 8.0 g. of gelatine and 2.0 g. of glycerin in about 120 g. of water. The mass is granulated through a suitable sieve and dried. A sieve mixture of 3.0 g. of highly dispersed silicic acid, 4.0 g. of magnesium stearate, 0.7 g. of flavouring and 42.3 g. of talcum is added to the dry granulate, thoroughly mixed in and the mixture is pressed into 1000 tablets.

EXAMPLE XII ($\beta$)

Gargle Concentrate: 5.0 g. of active substance are dissolved in 60.0 g. of 96 percent ethanol, 15.0 g. of glycerin and 0.3 g. of flavouring are added and the solution is made up to 100.0 g. with 19.7 g. of distilled water. For gargling, 5–20 drops of this concentrate are used in water.

EXAMPLE XIII ($\alpha$)

Tablets for the disinfection of intestines and urinal tract: To prepare 1000 tablets each containing 150 mg. of active substance, first 150.0 g. of active substance are thoroughly mixed with 60.0 g. of maize starch and 35.0 g. of lactose and the mixture is evenly wetted out with a granulating solution prepared from 5.0 g. of gelatine and 3.0 g. of glycerin in about 70 g. of water. The mass is granulated through a suitable sieve and dried. The granulate is thoroughly mixed with a sieved mixtuer of 15.0 g. of talcum, 10.0 g. of dried maize starch and 2.0 g. of magnesium stearate and the mixture is pressed into 1000 tablets.

EXAMPLE XIV ($\beta$)

Dragees for the disinfection of the intestines and urinal tract: To prepare 1,000 dragee cores, first 150.0 g. of active substance are thoroughly mixed with 60.0 g. of maize starch and 34.0 g. of lactose. This mixture is mixed with a binding agent consisting of 6.0 g. of starch, 3.0 g. of glycerin and about 54 g. of distilled water and the mass obtained is granulated through a suitable sieve and dried. The granulate is thoroughly mixed with a sieved mixture of 15.0 g. of talcum, 10.0 g. of maize starch and 2.0 g. of magnesium stearate and the mixture is pressed into 1,000 drages cores each weighing 280 mg.

Coating is carried out in the coating pan with a mixture consisting of: 2,000 g. of shellac, 7.500 g. of gum arabic, 0.180 g. of dyestuff, 2.000 g. of silicic acid, 35.00 g. of talcum and 58.320 g. of sugar.

1,000 Dragees are obtained each weighing 385 mg. and containing 150 mg. of active substance.

EXAMPLE XV

To a detergent composition liquefiable at high temperatures and composed of
- 40 g of sodium soap based on lauric, myristic and palmitic acid,
- 30 g of sodium tripolyphosphate,
- 5 g of tetrasodium pyrophosphate,
- 4 g of sodium silicate,
- 3 g of magnesium silicate,
- 0.5 g of tetrasodium salt of ethylene diamine tetraacetic acid,
- 5 g of sodium carbonate,
- 5.5 g of sodium sulfate and
- 70 g of water, there are added at 85° to 90°:
- 0.2 g of 1-(3'-chlorophenyl)-3-(4''-chb rophenyl)pyrazoline, and
- 1.5 g of the fumaric acid diester of 4,2',4'-trichloro-2-hydroxy-diphenylether.

The components are thoroughly mixed and then dried in the spray tower. A spreadable disinfectant detergent is obtained.

When 100 g. of undyed mixed polyamide cotton fabric are washed at a bath ratio of 1:20 for 20 minutes in a 60° warm wash liquor containing 16 g. of the above-described detergent and are then rinsed and dried, the washed mixed fabric has a brillant white appearance in day light and is protected against the growth of bacteria thereon for a considerable period of time.

EXAMPLE XVI 200 g of soap powder, consisting of
- 88.0 percent mixture of the sodium salt of tallow fatty acid and sodium salt of coconut oil fatty acid (weight ratio 70:30),
- 2.0 percent almond oil,
- 1.0 percent perfume,
- 0.2 percent titanium dioxide,
- 0.5 percent glycerol,
- 0.05 percent tetrasodium salt of ethylene diamine tetraacetic acid,
- 0.05 percent optical brightener (as in Example XV)
- 2.0 percent of the fumaric acid diester of 4,2',4'-trichloro-2-hydroxy-diphenyl ether, and
- 6.2 percent water, together with 400 ml of water are worked at 80° into a homogeneous mass and then dried at 70° to 80° in vacuo. A brightened disinfectant soap material is obtained which can be formed into pieces or ground into a powder.

EXAMPLE XVII 99.2 g of a heavy-duty non-soap detergent of the Syndet type consisting of
- 15.2 g of dodecyl benzene sulfonate,
- 3.8 g of sodium salt of lauryl alcohol sulfonic acid ester,
- 25.6 g of sodium tripolyphosphate,
- 7.6 g of tetrasodium pyrophosphate,
- 4.0 g of sodium silicate,
- 1.9 g of magnesium silicate,
- 5.0 g of sodium carbonate,
- 1.4 g of carboxymethylcellulose,
- 0.3 g of tetrasodium salt of ethylene diamine tetraacetic acid, and
- 34.4 g of sodium sulfate are mixed with 100 g of water to form a homogeneous slurry. To this mixture are added 0.1 g of 4,4'-bis[4'',6''-diphenylamino-1'',3'', 5''-triazinyl-(2'')-amino]-stilbene-2,2'-disulfonic acid and 0.05 g. of 1-(3'-fluorophenyl)-3-(4''-chlorophenyl)-pyrazoline, as well as 1.5g of the fumaric acid diester of 4,2',4'-trichloro-2-hydroxy-diphenylether, the whole is mixed well and then dried in the spray tower;

100 g. of laundry consisting of 30 g. of undyed nylon fabric and 70 g. of undyed cotton fabric are washed for 10 minutes at 85° in a wash liquor containing 8 g. of the above-described brightening detergent and having a bath ratio of 1:10. Then the goods are rinsed and dried. This washing process renders both types of fabric resistant to the growth of bacteria for a considerable length of time.

EXAMPLE XVIII

A detergent mixture consisting of
- 6.0 parts of tallow soap,
- 6.0 parts of dodecyl benzene sulfonate,
- 6.0 parts of the condensation product of nonylphenol and ethylene oxide (molar ratio 1:8.5),
- 40.0 parts of sodium tripolyphosphate,
- 0.2 part of tetrasodium salt of ethylene diamine tetraacetic acid,
- 8.0 parts of sodium silicate,
- 2.0 parts of magnesium silicate,
- 15.0 parts of sodium perborate ($naBO_3.4H_2O$),
- 2.0 parts of carboxymethyl cellulose,
- 0.2 part of disodium 4,4'-bis-[4''-($\beta$-methoxyethylamino)-6''-phenylamino-1'', 3'', 5''-triazinyl-(2'') -amino]-stilbene-2,2'-disulfonate, and
- 1.0 part of the fumaric acid diester of 4,2',4'-trichloro-2-hydroxy-diphenyl ether, is produced in the following manner:

the optical brightener is intimately mixed with normal aqueous sodium hydroxide solution (10 ml per gram of brightener) and when the brightener is thoroughly dispersed, about 200 to 300 ml of water (per gram of brightener) are added.

The other ingredients of the detergent mixture are mixed with each other separately and intimately using a sufficient amount of water to obtain a creamy paste, the latter is dried at 60° and granulated.

The detergent granules are then added to the slurry of brightener and the mixture is repeatedly and thoroughly stirred until a smooth, creamy mix is obtained. The resulting slurry is then spread into a uniform layer on a flat surface and dried in an oven at 85° for 16 hours. The resulting cake is allowed to cool to room temperature, left standing for at least 30 minutes and then crushed and placed in a dessicator. The dried chunks of detergent mixture are then forced through a 20 mesh screen and, if desired, the resulting powder is transferred to 60 mesh screen to remove the fine portion.

A detergent mixture is obtained which brightens textile materials washed therewith and, at the same time, renders them resistant to bacterial growth for a considerable length of time.

EXAMPLE XIX 10 parts of cotton cretonne are washed for 20 minutes with stirring in 200 parts of an aqueous wash liquor containing 1.5 g. of Marseille soap per liter and having a temperature of 65°.

The cotton fabric is then taken out of the wash liquor and rinsed twice, each time in 200 parts of water of 40° for 3 minutes; the fabric is then introduced into 200 parts of an aqueous liquor having a temperature of 40° and containing 0.4 part of the bacteriostatic softening agent, produced as described below, and is lightly stirred therein for 10 minutes. Thereupon, the cotton cretonne is removed from the aqueous liquor and air-dried. The fabric then shows a soft handle, and, in addition, inhibits the growth of bacteria thereon.

Production of bacteriostatic softener 86.7 g of commercially available di-(hydrogenated tallow)-dimethyl-ammoniumchloride fabric softener consisting of a mixture of
18 parts of di-hexadecyl-dimethyl-ammoniumchloride,
56.25 parts of di-octadecyl-dimethyl-ammoniumchloride,
0.75 part of di-octadecenyl-dimethyl-ammoniumchloride,
18 parts of isopropanol,
6.5 parts of water and
0.5 part of sodium chloride are heated with stirring at a temperature of 45°–50°, 7g of the fumaric acid diester of 4,2′,4′-trichloro-2-hydroxy-diphenyl ether are added and the whole is stirred for 30 minutes. The temperature is then raised to 55°–60° and warm water is added to make up a total weight of 1,000 g.

That the active ingredients of the Formulas IA to IV are suitable especially for the prevention and cure of infections of the urinal tract of warm-blooded animals on oral application by effectively combatting the growth of pathogenic bacteria therein, can be seen, for example, from the following tests:

a. Determination of the elimination of bacteriostatically active urine : Albino mice weighing from 18–22 g. are injected in the morning with 1 ml of physiological sodium chloride solution intraperitoneally. The urine is then collected for 2 hours in a metabolic cage. The substance to be tested is then administered per os and the urine is again collected over a period of 4 hours. The test is repeated on the following day with the same mice. To determine the bacteriostatic activity of the urine, nutrient agar is mixed with a suspension of Staphylococcus aureus and the mixture is poured into plates. After it has solidified, holes are made in the agar and each is filled with 0.1 ml of urine. The plates are stored for 24 hours at 37°C whereupon the diameter of the zones in which growth is inhibited is measured. After administration of 10 mg per kg bodyweight of the fumaric acid diester of 2-hydroxy-4,4′-dichlorodiphenyl ether or 2-hydroxy-4,2′, 4′-trichlorodiphenyl ether, respectively per os, diameters of inhibited zones of about 20–30 mm could be determined on plates containing Staphylococcus aureus.

As has already been mentioned, the active ingredients usable according to the invention are only slightly toxic ; the DL 50 on oral administration to the mouse is, in general above 5 g per kg bodyweight.

b. Similar tests to those carried out under (a) above also revealed an unexpected, desirable prolongation of the antibacterial activity of diester derivatives of Formula I compared with that of corresponding compounds falling under Formulas IA to IF.

When the new active ingredients of Formula IV are to be used for controlling phytopathogenic fungi, they are made up into fungicides which are suitable for the protection of plants and parts thereof such as blossom, seeds, fruit, roots, stalks and foliage, from attack by fungi.

The new fungicides of Formula I in the form of so-called seed dressings give seeds treated therewith a good protection, particularly from attack by Alternaria tenuis and Botrytis cinerea.

Antifungal agents are produced by methods known per se by intimately mixing and milling the active substances of general formula I with suitable carriers optionally with the addition of adhesives, dispersing agents or solvents which are inert to the active substances. These agents can be used in the following forms: Solid forms: dusts, sprinkling agents, granulates (coated granules, impregnated granules, homogeneous granules) Water dispersible concentrates of active substances: wettable powders, pastes, emulsions; Liquid forms: solutions; and Forms for the production of aerosols, fogs and fumigants.

To produce the solid forms for use (dusts and sprinkling agents, granulates), the active substances are brought on to solid carriers such as talcum, kaolin, bole, loess, chalk, limestone, ground limestone, ataclay, dolomite, diatomaceous earth, precipitated silicic acid, alkaline earth silicates, sodium and potassium aluminium silicates (feldspar and mica), calcium and magnesium sulphates, milled plastics, fertilisers such as ammonium sulphate, ammonium phosphates, ammonium nitrates, urea etc., and also ground nutshells, cellulose powder, residues of plant extractions, active charcoal etc. These carriers can be used alone or admixed with each other.

The particle size of the carriers is, for dusts up to about 100 $\mu$, for sprinkling agents from about 75 $\mu$ -0.2 mm and for granulates from 0.2 mm –1 mm (and coarser).

As a general rule, the concentrations of active substances in the solid preparations is from 0.5 – 80 percent.

To these mixtures can also be added additives which stabilise the active substance and/or non-ionic, anionic and cationic surface active substances which, for example, improve the adhesion of the active substances on parts of plants (glues, adhesives) and/or attain better wettability (wetting agents) and dispersibility of the active substances. Examples of such surface active substances are as follows: olein mixed with hydrate of lime, cellulose derivatives suitable for the preparation of aqueous solutions of a medium degree of viscosity (methyl celluloses, carboxymethyl celluloses, hydroxyethyl celluloses), galactomannan (guar gum), their anionic and cationic derivatives, polyethylene glycol ethers of mono- and di- alkyl phenols having 5 – 15 ethylene oxide radicals per molecule and 8 – 9 carbon atoms in the alkyl radical, (the commercial products known under the names "Triton," "Igepal," "Tergitol" etc.), condensation products of ethylene oxide/propylene oxide (medium molecular weight of the polyoxypropylene part: 1750; e.g. the commercial products known by the name "Pluronics"), sulphite waste liquor, alkali metal and alkaline earth metal salts thereof, mineral oils and polyethylene glycol ethers (Carbowax), fatty alcohol polyethylene glycol ethers (having 5–20 ethylene oxide radicals per molecule and 8–18 carbon atoms in the fatty alcohol moiety; e.g. the commercial products known by the trade name of "Genapol"), also dextrins, caseins, their calcium salts, proteins, polyvinyl pyrrolidones, polyvinyl alcohols (e.g. the commercial produce known as "Moviol"), condensation products of urea-formaldehyde and also latex products, etc.

In some cases it is necessary to add to these forms for application, plant, animal and mineral oils as penetrating agents, i.e., agents which help and improve the penetration of the active substance into the plants or parts thereof.

The concentrates of active substance which can be dispersed in water: wettable powders, pastes and emulsion concentrates, are agents which can be diluted with water to any concentration desired for application to plants and parts thereof. They consist of active substance, carrier, additives which stabilise the active substance, surface active substances, protective colloids and anti-foam agents and, optionally, solvents. The concentration of active substance in these agents is 5–80%.

Wettable powders and pastes are obtained by mixing and milling the active substances with surface active substances and pulverulent carriers in suitable mixers and milling machines until homogeneity is attained. Carriers are, for example, these menitoned in the paragraph dealing with solid forms for application. In some cases it is advantageous to use mixtures of carriers. By surface active substances, glues or adhesives, wetting and dispersing agents and protective colloids are to be understood. Of the glues and adhesives already mentioned, because of their properties a number thereof can be used as so-called auxiliary dispersing agents. Other dispersing agents and wetting agents which can be used are: condensation products of naphthalene and derivatives thereof with phenol and formaldehyde (the commercial products known as "Irgatan"), also aluminum salts of lignin sulphonic acids, further alkylaryl sulphonates, alkali metal salts and alkaline earth metal salts of dibutyl naphthalene sulphonic acid, fatty alcohol sulphates such as water soluble salts of sulphated hexadecanols, heptadecanols, octadecanols, octadecenols, the sodium salt of sulphated hexadecyl glycol ethers (the commercial products known as "Eriopon"), the sodium salt of oleyl methyl tauride (the commercial products known as "Arkopon"), ditertiary acetylene glycols (the commercial products known as "Surfynol"), dialkyldilauryl ammonium chloride (the commercial product known as "Aliquat"), and fatty acid alkali metal and alkaline earth metal salts.

Examples of anti-foam agents are: silicones, Antifoam A, etc.

The active substances are so mixed, milled, sieved and strained with the additives mentioned above that the solid particle size in wettable powders and in pastes is not more than 20 – 40 $\mu$ and 3 $\mu$ respectively. To produce emulsion concentrates and pastes, liquid dispersing agents such as those given in the previous paragraphs, organic solvents and water are used. Examples of solvents are as follows: alcohols, benzene, toluene, xylenes, dimethyl sulphoxide, dimethyl formamide and mineral oil fractions boiling between 120° and 350°. The solvents must be almost without smell not phytotoxic, inert to the active substances and not easily inflammable.

The forms for application which can be dispersed in water can also contain other additives to increase the stability to light, penetrating agents, anti-foam agents and also synergists.

The wettable powders, pastes and emulsion concentrates are diluted with water to the practical concentrations desired which are between 0.01 and 2 percent, calculated on the active substance. In the composition and concentration for use described, these application forms have good suspendibility which can be further improved, e.g., by the addition of synthetic voluminous silicic acid. The emulsifiable property of the emulsion concentrates is also very good.

In addition, the agents according to the invention can be in the form of solutions or sprays. For this purpose an active substance of general formula I can be dissolved in suitable organic solvents, mixtures of solvents or in water. Higher aliphatic and aromatic hydrocarbons, chlorinated derivatives thereof, alkyl naphthalenes alone or mixed with each other or with water can be used as organic solvents. The solutions contain the active substance in a concentration from 1 to 20 percent. They are used in the form of spray or mist with suitable spraying or mist blowing equipment.

Aerosols are produced from solutions of the active substances by the addition of propellants; aerosols are particularly suitable for use in the house and garden. Both the solutions and the aerosols can contain vegetable, animal and mineral oils to increase the adhesion and penetration and also additives to improve the resistance to rain and light.

Also, the active substance of general formula I can be worked up with a combustible substance, e.g., sawdust or paper and a source of oxygen such as potassium chlorate and potassium nitrate, to form a fumigant or fumigant paper.

The application forms described can be mixed very well with other biocidally active compounds or agents containing such compounds. Thus, to broaden the range of action, other fungicides, also insecticides, bactericides, fungistatics, bacteriostatics or nematicides can be present together with the active substances of general formula I. The active substances of general formula I can also be used with fertilisers, plant hormones, etc.

The following examples describe the production of various ready-for-use forms for application containing the active substances of general formula I. Parts are given therein as parts by weight.

DUST

Components:

a.
10 parts of the fumaric acid diester of 4,4'-dichloro-2-hydroxy-diphenylether
5 parts of highly dispersed silicic acid
85 parts of talcum.

b.
2 parts of 3-tetradecylamino-azacycloheptane-2-one hydrochloride
1 part of highly dispersed silicic acid 97 parts of talcum.

The active substances are intimately mixed and milled with the carriers. With components a) a 10 percent and with components b) a 2 percent dust is obtained which can be used for the treatment of seed beds or the dusting of plants.

DRESSING

To produce a 10 percent pulverulent dressing, the following components are used:

a.
10 parts of the fumaric acid diester of 4,4'-dichloro-2-hydroxy-diphenylether
5 parts of kieselguhr
1 part of liquid paraffin
84 parts of talcum.

To produce a 60 percent pulverulent dressing, the following components are used:

b.
60 parts of the fumaric acid diester of 4,2',4'-trichloro-2-hydroxy-diphenylether
15 parts of kieselguhr
1 part of liquid paraffin
24 parts of talcum.

The active ingredient is intimately mixed in a mixer, using the paraffin as distributing agent, with the carriers and the whole is milled. The pulverulent dressings obtained serve for the treatment of seeds of all types.

WETTABLE POWDER

Components:

a.
50 Parts of the fumaric acid diester of 4,4'-dichloro-2-hydroxy-diphenylether
15 parts of kieselguhr
2 parts of cetyl polyglycol ether
5 parts of tetramethyldecine-(5)-diol-(4,7) (Surfynol 104)
1.5 parts of a condensation product of propylene oxide and ethylene oxide ("Pluronic F 68")
1.5 parts of a condensation product of propylene oxide and ethylene oxide ("Pluronic L 61")
2 parts of silicone
23 parts of kaolin b.
50 parts of 3-methyl-dodecylamino-azacycloheptane-2-one
10 parts of kieselguhr
5 parts of cetyl polyglycol ether
35 parts of kaolin.

The active ingredients are mixed with the carriers and distributing agents given and finely milled. 50 percent wettable powders are obtained the wettability and suspendability of which are excellent.

On diluting these wettable powders with water, suspensions are produced which are suitable for the treatment of fruit trees.

GRANULATE

Components:

a.
4 Parts of one of the 50 percent wettable powders given above under a) or b)
3.5 parts of Carbowax
92 parts of ground limestone
0.5 part of highly dispersed silicic acid.

b.
2 parts of the fumaric acid diester of 4,2',4'-trichloro-2-hydroxy-dipehnylether
2 parts of Carbowax
95.5 parts of ground limestone
0.5 part of highly dispersed silicic acid.

The ground limestone is evenly impregnated with the Carbowax. This is then mixed with the mixture consisting of active ingredient or the wettable powder and the highly dispersed silicic acid.

These granulates are excellently suitable for the disinfection of seed beds.

PASTES

Components:

50 Parts of the fumaric acid diester of 4,4'-dichloro-2-hydroxy-dipehnylether
14 parts of nonylphenol/ethylene oxide condensation product (having 8 – 10 ethylene oxide groups per molecule)
3.5 parts of spindle oil
0.5 part of soap powder and
32 parts of water.

The active substance is intimately mixed and milled with the additives in a mixer. A 50 percent paste is obtained which, before use as fungicide, can be diltued with water to any concentration desired.

EMULSION CONCENTRATE

Components:

10 Parts of the fumaric acid diester of 4,2',4'-trichloro-2-hydroxy-diphenylether
55 parts of xylene
32 parts of dimethyl formamide
3 parts of emulsifying mixture: alkylaryl polyethylene glycol/ alkylaryl sulphonate/potassium salt.

The acitve substance is dissolved in the mixture of xylene and dimethyl formamide. This solution is then added to the emulsifying mixture. A 10 percent emulsifiable solution is obtained which can be diluted with water to form emulsions of any concentration desired.

We claim:

1. A composition for controlling the growth of bacteria and fungi comprising i. a bacteria and fungi growth-inhibiting amount of a compound of the formula R-O-acyl-O-R wherein "acyl" is the acyl radical of an aliphatic saturated $\alpha,\omega$-dicarboxylic acid of from 2 to 12 carbon atoms or of an aliphatic mono-olefinically unsaturated $\alpha,\omega$-dicarboxylic acid of from 4 to 12 carbon atoms, and R represents one of the following:

a. a radical of the formula

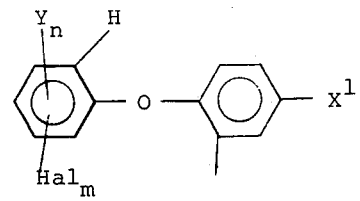

b. a radical of the formula

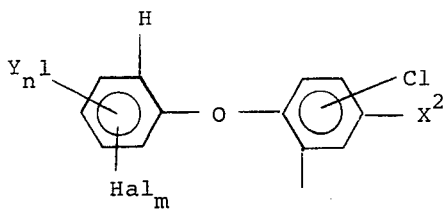

c. a radical of the formula

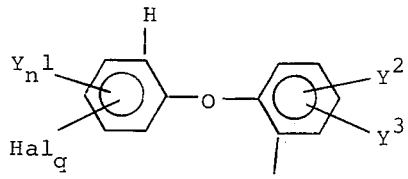

d. a radical of the formula

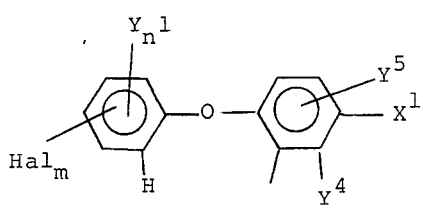

in which formulas
Hal represents a halogen atom,
m is an integer ranging from 0 to 4,
n is an integer ranging from 0 to 2, the sum of n+m being at most 4,
q is one of the integers 2 and 3, the sum of n+q being at most 3,
$X^1$ represents halogen,
$X^2$ represents hydrogen or chlorine,
Y represents hydrogen, alkyl of from 1 to 3 carbon atoms, alkoxy of from 1 to 3 carbon atoms, alkanoyl of from 1 to 4 carbon atoms, trifluoromethyl, cyano or amino, each of $Y^1$,
$Y^2$ and $Y^3$ represents hydrogen, alkyl of from 1 to 3 carbon atoms or cyano,
$Y^4$ represents hydrogen, alkyl of from 1 to 3 carbon atoms or allyl, and
$Y^5$ represents hydrogen or alkyl of from 1 to 3 carbon atoms, not more than one of $Y^4$ and $Y^5$ being hydrogen;
  ii. water or an organic solvent for said compound, or both; and
  iii. a detergent.
2. A composition as defined in claim 1, wherein said compound is of the formula

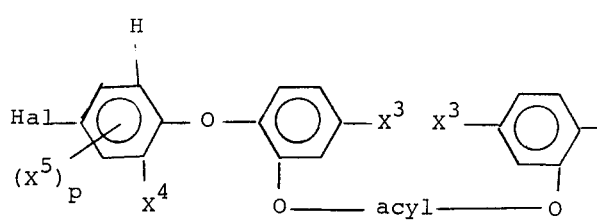

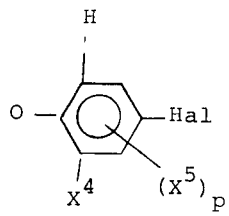

wherein
"acyl" is the acyl radical of an aliphatic saturated α,ω-dicarboxylic acid of from 2 to 12 carbon atoms or of an aliphatic unsaturated α,ω-dicarboxylic acid of from 4 to 12 carbon atoms,
$X^3$ is a member selected from the group consisting of chlorine, bromine and fluorine,
Hal is a halogen atom,
$X^4$ is a member selected from the group consisting of hydrogen, chlorine, bromine and cyano,
$X^5$ is a member selected from the group consisting of hydrogen, chlorine, bromine, alkyl of from 1 to 3 carbon atoms, and
p is one of the integers 1 and 2.
3. A composition as defined in claim 1, wherein said compound is of the formula

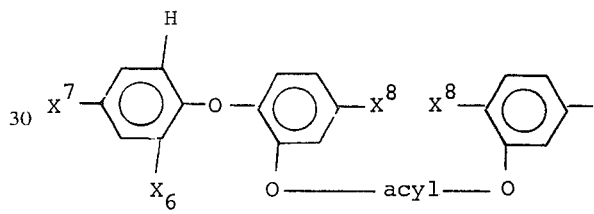

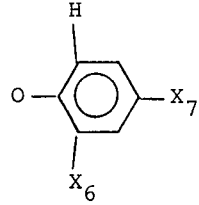

wherein
"acyl" is the acyl radical of an aliphatic saturated α,ω-dicarboxylic acid of from 2 to 12 carbon atoms or of an aliphatic unsaturated α,ω-dicarboxylic acid of from 4 to 12 carbon atoms,
$X^6$ is a member selected from the group consisting of hydrogen and chlorine,
$X^7$ is a member selected from the group consisting of chlorine and bromine, and
$X^8$ is a member selected from the group consisting of chlorine and bromine.
4. A composition as defined in claim 1 wherein in said compound each R represents 1-(4'-chlorophenoxy)-4-chlorophenyl-(2) and "acyl" represents the divalent fumaroyl radical.
5. A composition as defined in claim 1 wherein in said compound each R represents 1-(2',4'-dichlorophenoxy)-4-chloro-phenyl-(2) and "acyl" represents the divalent succinoyl radical.
6. A composition as defined in claim 1 wherein in said compound each R represents 1-(4'-chlorophenoxy)-4-bromophenyl-(2) and "acyl" represents the divalent glutaroyl radical.

* * * * *